United States Patent
Alpert et al.

(10) Patent No.: US 11,855,810 B2
(45) Date of Patent: Dec. 26, 2023

(54) SIMULTANEOUS CSI AT SINGLE RX CHAIN DEVICE

(71) Applicant: TEXAS INSTRUMENTS INCORPORATED, Dallas, TX (US)

(72) Inventors: Yaron Alpert, Hod Hasharon (IL); Matan Ben-Shachar, Ra'anana (IL); Anand Ganesh Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 255 days.

(21) Appl. No.: 17/504,144

(22) Filed: Oct. 18, 2021

(65) Prior Publication Data

US 2022/0123964 A1 Apr. 21, 2022

Related U.S. Application Data

(60) Provisional application No. 63/093,417, filed on Oct. 19, 2020.

(51) Int. Cl.
  *H04L 25/02* (2006.01)
  *H04L 27/26* (2006.01)
  *H04B 7/06* (2006.01)
  *H04W 84/12* (2009.01)

(52) U.S. Cl.
  CPC ....... *H04L 25/0202* (2013.01); *H04B 7/0626* (2013.01); *H04L 27/2601* (2013.01); *H04W 84/12* (2013.01)

(58) Field of Classification Search
  CPC .................................................. H04L 25/0202
  See application file for complete search history.

(56) References Cited

U.S. PATENT DOCUMENTS

| 10,469,140 B1* | 11/2019 | Dehghan | ............. H04B 7/0413 |
| 2008/0139153 A1* | 6/2008 | Tuo | ...................... H04B 17/391 455/277.2 |

(Continued)

FOREIGN PATENT DOCUMENTS

| CN | 105611627 A | 5/2016 |
| CN | 111726199 A | 9/2020 |

OTHER PUBLICATIONS

PCT International Search Report; PCT/US2021/0555601; dated Feb. 3, 2022; 2 pages.

*Primary Examiner* — Jason E Mattis
(74) *Attorney, Agent, or Firm* — Mandy Barsilai Fernandez; Frank D. Cimino

(57) ABSTRACT

A user client device with a single receive (RX) chain, a first antenna and a second antenna, and a processor that causes the user client device to couple the single RX chain to the first antenna to receive a first data packet on a first channel and determine a first channel state information (CSI) tile of the first channel based on one or more fields in the first data packet, decouple the first antenna from the single RX chain and couple the second antenna to the single RX chain to continue receiving the first data packet on a second channel, determine a second CSI tile of the second channel based on one or more of a portion of the first plurality of fields, aggregate the first CSI tile with the second CSI tile, and generate a CSI matrix based on aggregating the first CSI tile with the second CSI tile.

20 Claims, 4 Drawing Sheets

(56) References Cited

U.S. PATENT DOCUMENTS

| | | | |
|---|---|---|---|
| 2014/0161091 A1* | 6/2014 | Adhikary | H04B 7/0452 |
| | | | 370/329 |
| 2015/0188662 A1* | 7/2015 | Shapira | H04K 3/43 |
| | | | 455/1 |
| 2015/0288497 A1 | 10/2015 | Li et al. | |
| 2016/0277091 A1 | 9/2016 | Kim et al. | |
| 2020/0036431 A1* | 1/2020 | Petersson | H04B 7/088 |
| 2021/0105157 A1* | 4/2021 | Yuan | H04L 25/0242 |
| 2023/0033260 A1* | 2/2023 | Rupasinghe | H04B 7/0413 |
| 2023/0064862 A1* | 3/2023 | Lu | H04L 5/0051 |

\* cited by examiner

SIMULTANEOUS CSI AT SINGLE RX CHAIN DEVICE

CROSS-REFERENCE TO RELATED APPLICATIONS

The present application claims priority to U.S. Provisional Patent Application No. 63/093,417, which was filed Oct. 19, 2020, is titled "Simultaneous CSI At Single RX Chain Device," and is hereby incorporated herein by reference in its entirety.

BACKGROUND

A wireless signal (for example, a frame) transmitted in a network travels along multiple paths from a transmitter (for example, access point (AP)) to a receiver (for example, a user client device/node). In wireless communications, channel state information (CSI) represents how wireless signals propagate from the transmitter to the receiver at certain carrier frequencies along multiple paths via a specific radio frequency (RF) chain configuration. CSI represents the combined effect of, in examples, scattering, fading, power decay with distance, delay spread, multipath characteristics of the channel, and the transmit (TX) and receive (RX) RF chain configuration. A CSI matrix is a three-dimension (3D) matrix of complex values representing magnitude and phase shift of a transmitted wireless signal and channels. A CSI matrix comprises a list of multiple two-dimension (2D) values (also referred to as CSI tile) for each receiver-transmitter pair in an RF chain configuration, per certain carrier frequencies (for example, multiple frequencies) and at a time period. A CSI matrix can be used for different sensing applications such as, for example, for "locationing," performance measurements, and for human presence detection. As used herein, locationing is identifying a location or a position of a device in an environment, and its uses can include locating a position of an automobile to enable keyless entry of the automobile, locating an object (for example, a person) in an indoor environment (for example, shopping mall) in order to navigate inside the indoor environment, etc. As used herein, human presence detection is a process of identifying a change has occurred in an environment, and movement of an object (for example, to detect human falls, detect a position of an object, and object movements). The method to obtain a CSI matrix is referred to as channel estimation (for example, estimating a channel).

SUMMARY

In accordance with at least one example of the disclosure, a user client device for channel estimation in a network includes a transceiver with a single RX chain, a first antenna coupled to the transceiver, a second antenna coupled to the transceiver; and a processor coupled to the transceiver, the first antenna, and the second antenna. The processor is configured to execute instructions that cause the user client device to couple the single RX chain to the first antenna to receive a first data packet on a first channel, where the first data packet comprises a first plurality of fields; determine a first CSI tile of the first channel based on one or more of the first plurality of fields; decouple the first antenna from the single RX chain and couple the second antenna to the single RX chain to continue receiving the first data packet on a second channel, where the first data packet on the second channel comprises a portion of the first plurality of fields; determine a second CSI tile of the second channel based on one or more of the portion of the first plurality of fields, aggregate the first CSI tile with the second CSI tile; and generate a CSI matrix based on aggregating the first CSI tile with the second CSI tile.

In accordance with at least one example of the disclosure, a system for channel estimation in a network includes a transmit node configured to transmit a first data packet and a first user client node wirelessly coupled to the transmit node. The first user client node includes a transceiver with a single RX chain, a first antenna, and a second antenna; and a processor coupled to the transceiver, the first antenna, and the second antenna and configured to execute instructions that cause the first user client node to couple the single RX chain to the first antenna; receive the first data packet from the first antenna, where the first data packet comprises a first physical layer (PHY) preamble, a first PHY header, and a first media access control (MAC) header; determine a first CSI tile based on one or more of the first PHY preamble, the first PHY header, and the first MAC header of the first data packet from the first antenna; decouple the first antenna from the single RX chain and couple the second antenna to the single RX chain; continue to receive the first data packet from the second antenna, where the second data packet comprises at least a portion of the first PHY preamble, the first PHY header, and the first MAC header; determine a second CSI tile based on the first data packet from the second antenna; aggregate the first CSI tile with the second CSI tile; and generate a CSI matrix based on aggregating the first CSI tile with the second CSI tile.

In accordance with at least one example of the disclosure, a method for channel estimation in a network comprises providing a user client device comprising a single RX chain transceiver, a first antenna, and a second antenna; coupling the single RX chain transceiver to the first antenna; receiving, by the first antenna, a first data packet on a first channel, where the first data packet comprises a first plurality of fields; determining a first CSI tile of the first channel based on one or more of the first plurality of fields; decoupling the first antenna from the single RX chain transceiver and coupling the second antenna to the single RX chain transceiver; receiving, by the second antenna, a second data packet on a second channel, where the second data packet comprises a second plurality of fields; determining a second CSI tile of the second channel based on one or more of the second plurality of fields; aggregating the first CSI tile with the second CSI tile; and generating a CSI matrix based on aggregating the first CSI tile with the second CSI tile.

BRIEF DESCRIPTION OF THE DRAWINGS

For a detailed description of various examples, reference will now be made to the accompanying drawings in which.

DETAILED DESCRIPTION

Figure 1:
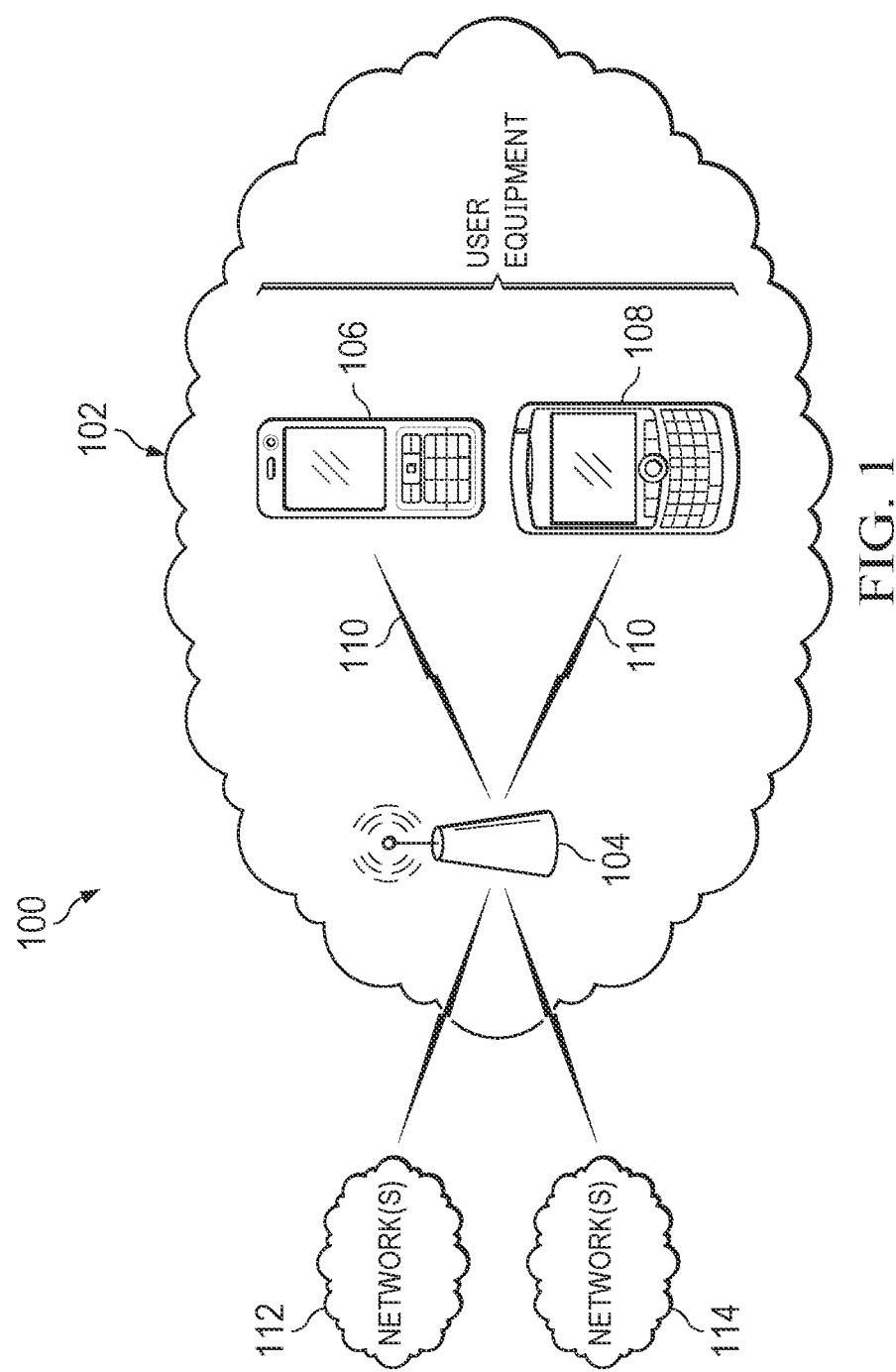
FIG. 1 is a block diagram of a network environment in accordance with various examples.

A user client device can include a single receive (RX) chain radio or a multiple RX chain radio. An RX chain radio (also called RX chain) includes a radio with all of its supporting architecture, including mixers, amplifiers, and analog/digital converters. Multiple RX chains include several RX chain radios. A user client device that has multiple RX chains improves its channel estimation over user client devices with a single RX chain as the CSI matrix includes multiple CSI tiles that are obtained for multiple frequencies, multiple receivers and transmitters, and over several time periods. A transmit node/network node in a wireless local area network (WLAN (also generally referred to as WIFI)), for example, a WIFI AP, WIFI router, or a user client device, generally uses multiple-input multiple-output (MIMO) technology with orthogonal frequency division multiplexing (OFDM) to send and receive signals wirelessly to other network devices using its operating bandwidth (for example, an 80 Megahertz (MHz) bandwidth, a 160 MHz bandwidth, or a 320 MHz bandwidth). These transmit nodes have multiple RX chain radios. Each RX chain radio (hereinafter RX chain) comprises multiple antennas to simultaneously transmit and receive data in the WLAN. Each RX chain provides a matrix of CSI values for an antenna and subcarrier frequency. A CSI matrix that is obtained from multiple RX chains provides channel estimation spatially and over several channels, and may provide enhanced locationing, sensing, and performance measurements compared to a CSI matrix from a single RX chain.

Internet of things (IoT) devices are prevalently being used in homes (for example, a thermostat or a door bell camera) or are being carried on persons (for example, a heartrate tracker) to provide a connected environment. These IoT devices may be low-cost devices that use commodity WIFI transceivers with a single RX chain and a single antenna. Further, these low-cost IoT devices operate over a lower channel bandwidth (for example, over a 20 MHz channel bandwidth based on the Institute of Electrical and Electronics Engineers (IEEE) 802.11 20 MHz only station (STA) operation profile). As such, the CSI for these low-cost IoT devices is a CSI tile, which limits accuracy of locationing, sensitivity of sensing, and performance. Further, the limited locationing, sensing, and performance of the CSI tile from IoT devices hinders its ability to be deployed in locationing and sensing applications.

Disclosed herein are examples of channel estimation techniques for estimating a CSI matrix using a user client device (for example, STA) with a single RX chain and at least two antennas when a WLAN packet (for example, WIFI packet) is wirelessly transmitted from a transmitter node. The CSI matrix obtained with the STA is equivalent to the quality of a CSI matrix that is obtained from a multiple RX chain STA (hereinafter referred to as an equivalent CSI matrix).

In an example, a user client device performs a channel estimation technique by identifying an opportunity to obtain CSI values when a signal (for example, WIFI signal) is transmitted over a 20 MHz channel bandwidth from a transmit node (for example, an AP) to the STA. In examples, the signal is a predicted WLAN packet (also referred to as a repetitive WLAN packet such as, for example, an AP beacon frame transmission) or an unpredicted WLAN packet (also referred to as a random WLAN packet such as, for example, an AP transmission to STAs). In examples, the STA receives WLAN packets at a first antenna that include OFDM symbols on different subcarrier frequencies ("subcarriers") or different central frequencies. The OFDM symbols may be transmitted in one or more fields of the WLAN packet. In an example, the OFDM symbols are received from an IEEE 802.11 PHY preamble field, an IEEE 802.11 PHY header field, an IEEE 802.11 MAC header field, or IEEE 802.11 payload data field. The OFDM symbol may include data subcarrier (for example, frequency) components and pilot subcarrier components. The user client device may synchronize to the fields of the WLAN packet and/or to pilot subcarrier components of the WLAN packet when the WLAN packet is received at the first antenna (also referred to as a first CSI tile antenna) and/or obtain information from the data subcarrier components for channel estimation. In examples, the STA receives WLAN packets that are directed to (for example, intended for) a neighboring STA that is a neighbor of the STA. In an example, the STA receives WLAN packets that are directed to (for example, intended for) the STA. In an example, the PHY preamble fields may include synchronization information such as, for example, one or more short training fields (STFs), one or more long training fields (LTFs), and one or more signal (SIG) fields. In an example, the PHY header field may include fields that provide information about the packet configuration, such as format, data rates, etc. In an example, the MAC header field includes, for example, an internet protocol (IP) address field of the destination or the source. In an example, the payload data fields include a repetitive data field such as, for example, a packet extension (PE) field that resides at the end of a WLAN packet. The STA generates or determines a first CSI tile using information determined from one or more of the PHY preamble field, the PHY header field, MAC header field, or data fields.

In an example, the STA switches to a second antenna while receiving a signal using intra-WLAN packet antenna switching. In an example, the second antenna may also be referred to as a second CSI tile antenna. In an example, the STA switches using intra-WLAN packet antenna switching to obtain information from the WLAN packet during a transmission stream. In an example, intra-WLAN packet antenna switching from the first antenna to the second antenna occurs as the WLAN packet is being received as a single WLAN packet at both the first and the second antenna without a gap in transmission of the WLAN packet. To illustrate, in a first period, the STA does not transmit or receive a WLAN packet. In a second period, the STA receives a WLAN packet from the transmitter node at a first antenna, and switches to a second antenna to continue receiving the WLAN packet at the second antenna without a gap in transmission from the transmitter node. In an example, the STA may also receive another WLAN packet at the second antenna. In an example, the STA receives (for example, obtains) a WLAN packet at the second antenna over a multi-path channel. In an example, a multi-path channel represents several paths including a direct path and additional paths that a WLAN packet travels as it is reflected and/or refracted from obstacles as the WLAN packet wirelessly travels from the destination node to the STAs. In an example, the WLAN packet experiences multi-path effects (for example, amplitude attenuation and/or phase-shift from reflections and refractions) in the multi-path channel. The STA generates a second CSI tile based on the intra-WLAN packet antenna switching from the first antenna to the second antenna using one or more fields such as, for example, using the packet LTF(s) that is received at the second antenna and combines the CSI tiles to obtain a two-antenna equivalent CSI matrix. In another example, during inter-WLAN packet antenna switching during a transmission stream at a different time period, the STA generates an equivalent combined CSI matrix over a 40 MHz channel using the first 20 MHz CSI tile and the second 20 MHz CSI tile by combining the first CSI tile obtained over a 20 MHz channel bandwidth with a second CSI tile obtained over a second 20 MHz channel bandwidth. In an example, inter-WLAN packet antenna switching from the first antenna to the second antenna occurs while there is a gap in transmission or reception from the transmitter node. To illustrate, in a first period, the STA does not transmit or receive a WLAN packet. In a second period, the STA receives a WLAN packet from the transmitter node at a first antenna. The transmitter node stops transmitting (for example, gap in transmission), where the STA switches to a second antenna, and uses the second antenna to receive another WLAN packet at the second antenna. The channel estimation technique enables a single RX chain device (for example, low-cost IoT device) to be deployed for CSI-based locationing, sensing, and performance improvements, and overcomes the problems of a low-cost IoT device with a single RX chain. For example, the low-cost IoT device emulates a higher-cost network device with multiple RX chains and multiple antennas by providing an equivalent CSI matrix that can be used for CSI-based locationing, sensing, and performance improvements. Further, the equivalent CSI matrix obtained by the low-cost IoT device is an IEEE 802.11 standards compliant CSI matrix for CSI-based applications.

FIG. 1 is a schematic diagram of a network environment 100 in accordance with various examples. In an example, network environment 100 (for example, WIFI type environment) includes a communication network 102, a transmit node 104, user client nodes/devices 106 and 108 (also called STA), communication link 110, and communications networks 112 and 114.

In an example, communication network 102 uses a wireless network communication protocol such as IEEE, or other suitable protocol that is based on the IEEE 802.11, 802.11/WIFI, IEEE 802.16/WiMAX (hereinafter WLAN), BLUETOOTH (BT), BLUETOOTH low energy (BLE), ZIGBEE, ultra-wideband (UWB), and cellular communications under the 3rd Generation Partnership Project (3GPP), for example, 5G and 4G long term evolution (LTE).

In examples, transmit node 104 is an AP, a router, a switch, or any other network device with multiple RX chains and multiple antennas. In an example, STA 106 and STA 108 are single RX chain devices (for example, user clients) with at least two antennas. In an example, STA 106 and STA 108 and transmit node 104 are configured to use communication link 110 to perform wireless communication in communication network 102. In an example, STA 106, STA 108, and transmit node 104 are associated in communication network 102 as a basic service set (BSS), which includes a group of stations that form an association in the communication network 102. In an example, transmit node 104 is configured to simultaneously transmit WLAN packets in the communication network 102.

In examples, STA 106 and STA 108 are low-cost IoT devices (for example, mobile IoT devices or fixed IoT devices with a single RX chain) that communicate with transmit node 104 via communication link 110. In an example, STA 106 and STA 108 include a network access layer designed for low-power IoT applications utilizing short-lived connections to transmit node 104.

In an example, communications networks 112 and 114 are communicatively coupled to transmit node 104. In examples, communications networks 112 and 114 include any one of a combination of different types of suitable communications networks such as, for example, broadcasting networks, cable networks, public networks (for example, the Internet), private networks, wireless networks, cellular networks, or any other suitable private and/or public networks. In an example, any of communications networks 112 and 114 may have any suitable communication range associated therewith and include global networks (for example, the Internet), metropolitan area networks (MANs), wide area networks (WANs), local area networks (LANs), or personal area networks (PANs). In an example, communications networks 112 and 114 include any type of medium over which network traffic may be carried and may include, in examples, coaxial cable, twisted-pair wire, optical fiber, a hybrid fiber coaxial (HFC) medium, microwave terrestrial transceivers, RF communication mediums, white space communication mediums, ultra-high frequency communication mediums, satellite communication mediums, or any combination thereof.

In operation, STA 106 and STA 108 are operable to perform intra-WLAN packet channel estimation techniques (for example, channel estimation using a single WLAN packet) or inter-WLAN packet channel estimation techniques (for example, channel estimation using multiple WLAN packets) in a WLAN network using a single RX chain. In an example, the channel estimation technique is performed using a WLAN packet that is received from transmit node 104 based on an IEEE 802.11 standard. In an example, transmit node 104 is configured to transmit WLAN packets using block-based modulation (for example, OFDM), Orthogonal Frequency Division Multiplexing Access (OFDMA), or other multicarrier modulation methods. The term "block-based modulation" as used herein refers to operations performed in a WIFI type environment. In an example, STA 106 and STA 108 listen for signal transmissions (for example, WLAN/WIFI packets) from transmit node 104 over communication link 110. In an example, a WLAN packet may comprise a physical layer protocol data unit (PPDU) frame with a preamble field, a header field, and payload data fields. Each WLAN packet is transmitted over a 20 MHz channel bandwidth, and includes OFDM symbols in the preamble field, a header field, and payload data fields that may be used for intra- or inter-WLAN packet channel estimation. In an example where a WLAN packet is a legacy OFDM-based WLAN packet (for example, a classic WIFI packet of an IEEE 802.11a/g/p/j/n/ac/ah WLAN packet), an OFDM symbol includes 48 data subcarriers (for example, frequency index of −26 to +26) and 4 pilot signals/tones (for example, frequency indices of ±21 and ±7). In an example when the WLAN packet is a WIFI-6 OFDMA-based WLAN packet (for example, 802.11ax) or a WIFI-7 OFDMA-based WLAN packet (for example, 802.11be), the WLAN packet includes a resource unit. The resource unit denotes a group of 78.125 kilohertz (kHz) bandwidth subcarriers that may include 26, 52, 106, 242, 484 or 996 subcarriers, and includes OFDM symbols with pilot signals that are in fixed locations (for example, fixed frequency indices). In an example, pilot signals are subcarriers that include a known signal at predetermined or predefined subcarriers or frequencies. In an example, for a 20 MHz channel bandwidth with a resource unit size of 26-subcarriers or 52-subcarriers, the pilot signals are at ±10, ±22, ±36, ±48, ±62, ±76, ±90, ±102, and ±116 frequency indices, and for a resource unit size of 106-subcarriers or 242-subcarriers, the pilot signals are at ±22, ±48, ±90, and ±116 frequency indices. In examples, STA 106 and STA 108 may be operable to perform a channel estimation technique using pilot signals from WLAN packets that are transmitted over a higher channel bandwidth, for example, over channel bandwidths of 40 MHz, 80 MHz, 160 MHz, or 320 MHz which is disclosed in the IEEE 802.11ax and 802.11be standards that are herein incorporated by reference. In examples, transmit node 104 transmits WLAN packets intended for either STA 106 or STA 108 within communication network 102. In an example, STA 108 listens on a channel in the WLAN and receives the WLAN packet or packets not intended for STA 108. In an example, either STA 106 or STA 108 receives WLAN packets from transmit node 104 that are not intended for either STA 106 or STA 108.

In an example, each STA 106 and STA 108 is operable to switch its antenna to receive a single WLAN transmission stream from transmit node 104 in a 20 MHz channel bandwidth over a single RX chain. In an example, each STA 106 and STA 108 is operable to switch its antenna to receive multiple transmission streams over a wideband channel bandwidth (for example, 80 MHz or 160 MHz). In examples, STA 106 and STA 108 each have two antennas that are alternately switched when receiving a signal from transmit node 104 (for example, a WLAN packet). In an example, STA 106 or STA 108 listens on a WLAN channel for available transmissions from the transmit node 104. STA 106 or STA 108 passively scans the WLAN channels in communication network 102 to detect and receive available transmissions from transmit node 104. In an example, STA 106 or STA 108 waits to receive a WLAN packet from the transmit node 104. In an example, the WLAN packet may be a predicted WLAN packet such as a beacon frame that is periodically transmitted from the transmit node 104 to stations in the BSS. The WLAN packet contains information about the transmit node 104 along with a timing reference.

In an example, STA 106 or STA 108 obtains (for example, generates) a CSI matrix for a WLAN channel during a single WLAN transmission or for multiple WLAN transmissions using the first antenna and the second antenna ("combined CSI matrix"). In examples, the combined CSI matrix is obtained from information in the preamble of a layer 1 PHY layer, from information in the MAC header, from in a payload field of the WLAN packet, or information in other fields as discussed above in FIG. 1. In an example, the combined CSI matrix is generated from CSI tiles that are stitched together (for example, aggregated or combined) using multiple intra- and/or inter-WLAN packet CSI tiles that are generated from signals that are received at the antennas. In an example for STA 106 or STA 108 with two antennas, the antennas are alternatively switched between the first antenna and the second antenna to receive the WLAN packet during a single WLAN transmission. In an example, the CSI matrix is an equivalent CSI matrix that is available for use in location sensing and other positioning applications. The channel estimation technique enables a single RX chain device (for example, a low-cost IoT device) to be deployed for CSI-based locationing, sensing, and performance improvements and overcomes the problems of low-cost IoT devices with single RX chains. For example, the low-cost IoT device emulates a higher-cost network device with multiple RX chains and multiple antennas by providing the equivalent CSI matrix that can be used for CSI-based locationing, sensing, and performance improvements. Further, the equivalent CSI matrix obtained by STA 106 or STA 108 is an IEEE 802.11 standards compliant CSI matrix for CSI-based applications. Therefore, as a practical matter, the channel estimation technique improves the performance of STA 106 or STA 108 and transmit node 104 in the communication network 102 and the overall network, which enables the STA 106 or STA 108 to be deployed in CSI-based applications.

Figure 2:
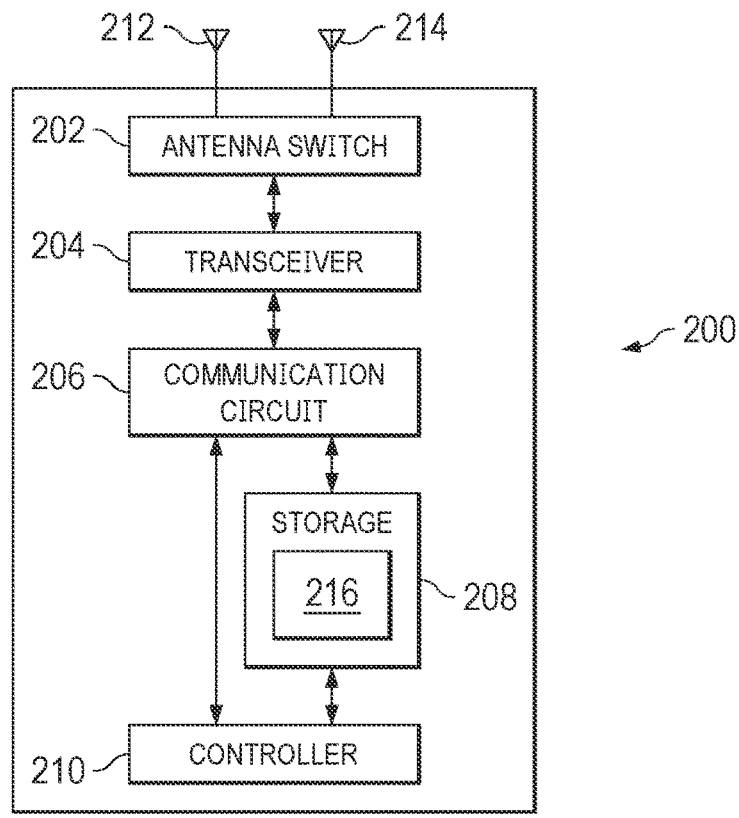
FIG. 2 is a block diagram of a computing device in accordance with various examples.

FIG. 2 is a block diagram of an STA 200 in accordance with various examples. STA 200 is an example of STA 106 or STA 108 (shown in FIG. 1). In an example, STA 200 includes antenna switch 202, transceiver 204, communication circuit 206, storage 208, controller 210, antenna 212, antenna 214, and software applications 216. While STA 200 is shown with two antennas 212 and 214, in an example, STA 200 may include additional antennas that are substantially similar to antennas 212 and 214. In an example, antenna switch 202 is electrically coupled to antennas 212 and 214. Transceiver 204 is coupled to antennas 212 and 214, and to communication circuit 206. Communication circuit 206 is coupled to storage 208 and controller 210. Storage 208 stores software applications 216, which includes executable instructions.

In an example, STA 200 is a single RX chain device with multiple antennas (for example, antenna 212 and antenna 214). In examples, antenna 212 and antenna 214 are dipole antennas, monopole antennas, patch antennas, loop antennas, microstrip antennas, or other types of antennas suitable for transmission of RF signals. In examples, instead of antenna 212 and antenna 214, a single antenna with multiple apertures may be used. In an example, each aperture may be considered a separate antenna. In an example, the antennas 212 and 214 may be effectively separated for spatial diversity and the different channel characteristics that may result between each of antenna 212 and antenna 214 and the antennas of a transmitting station. In examples, antennas 212 and 214 are operable to receive a transmission stream in a 20 MHz channel bandwidth as OFDM or OFDMA bursted transmissions or pulse type signals (for example, WLAN packets) from an RF transmitter at a transmit node (for example, transmit node 104 shown in FIG. 1). Multiple transmission streams may be transmitted over 20 MHz channel bandwidths in a WLAN that the STA 200 operates. In an example, a transmit node is transmit node 104 shown in FIG. 1.

In an example, antenna switch 202 is operable to switch between antenna 212 an antenna 214 while receiving a transmission stream such that antenna 212 and antenna 214 are alternately coupled to transceiver 204. Switching between antenna 212 and antenna 214 results in the transmission stream to be received at antenna 212 and antenna 214 at different time periods. In an example, antennas 212 and 214 are tunable to the frequency of the transmission stream so that subcarriers in the transmission stream are received by the antennas 212 and 214. In an example, each antenna 212 and 214 may be switched during a transmission stream (for example, intra-WLAN packet) to receive a subcarrier and/or switched at different transmission time periods (for example, to obtain an inter-WLAN packet). Each antenna 212 and 214 is tunable to a frequency of a 20 MHz channel bandwidth transmission stream over a wideband bandwidth of the transmit node (for example, transmit node 104 shown in FIG. 1).

In an example, transceiver 204 includes a transmitter, receiver, and other RF circuits that provide an RX chain. The transceiver 204 amplifies the transmission stream that is received from antennas 212 and 214 and outputs it to communication circuit 206. A transmission stream for transmission over antennas 212 and 214 is received from communication circuit 206 and sent to antennas 212 and 214.

Communication circuit 206 is operable to implement modulation and framing of WLAN packets in the transmission stream according to the applicable communication protocol or standard (for example, IEEE 802.11) under control of controller 210.

In an example, communication circuit 206 receives as input, a transmission stream of RF transmitters (for example, transmit node 104 in FIG. 1) from transceiver 204. In an example, analog-to-digital converters (ADCs) and digital-to-analog converters (DACs) reside between the outputs of transceiver 204 and communication circuit 206, within communication circuit 206, or within transceiver 204. The ADCs demodulate transmission streams from the transceiver 204 and DACs modulate transmission streams for transmission by antenna 212 and antenna 214. In examples, the communication circuit 206 may be arranged to contend for a wireless medium (for example, WLAN) and configure transmission streams for communicating over the wireless medium. The communication circuit 206 may be arranged to transmit and receive signals. The communication circuit 206 may also include circuitry for modulation/demodulation, up conversion/down conversion, filtering, amplification, etc.

In an example, transceiver 204 and communication circuit 206 transmit and receive transmission streams to and from other communication stations using one or more antennas 212 and 214. In an example, communication circuit 206 includes circuitry that can operate a PHY communications and/or an IEEE 802.11 MAC communications for controlling access to the wireless medium, and/or any other communications layers for transmitting and receiving signals. The STA 200 may also include controller 210 with processing circuits and storage 208 arranged to perform the operations described herein.

In some examples, storage 208 includes any type of memory, including non-transitory memory, for storing information in a form readable by a machine (for example, a computer). For example, storage 208 may include a computer-readable storage device, read-only memory (ROM), random-access memory (RAM), magnetic disk storage media, optical storage media, flash-memory devices, and other storage devices and media. In an example, storage 208 stores one or more software applications 216 (for example, embedded applications) for performing a channel estimation technique that is described herein. In an example, storage 208 stores information for configuring controller 210 for performing a channel estimation technique using a transmission stream received by STA 200. The one or more software applications 216 (for example, embedded applications), when executed by controller 210, perform functions associated with STA 200 that are described herein. Certain examples may be implemented in one or a combination of hardware, firmware, and software. Other examples may also be implemented as instructions stored on a computer-readable storage device, which may be read and executed by at least one processor to perform the operations described herein. A computer-readable storage device may include any non-transitory memory mechanism for storing information in a form readable by a machine (for example, a computer). For example, a computer-readable storage device may include ROM, RAM, magnetic disk storage media, optical storage media, flash-memory devices, and other storage devices and media.

In an example, controller 210 includes one or more processors and may be configured with instructions stored on a computer-readable storage device memory. Controller 210 includes logic to perform channel estimation described herein. The logic may be encoded in one or more tangible media (for example, storage 208) for execution by a processor in controller 210. For example, the processor may execute computer-readable instructions stored in a non-transitory computer-readable medium such as storage 208. The logic may be in the form of software executed by a processor, digital signal processor (DSP) instructions, or in the form of fixed logic in an integrated circuit, for example.

In examples, STA 200 may be part of an IoT device, such as a personal digital assistant (PDA), a laptop or portable computer with wireless communication capability, a web tablet, a wireless telephone, a smartphone, a wireless headset, a pager, an instant messaging device, a digital camera, an AP, a television, a medical device (for example, a heart rate monitor, a blood pressure monitor, etc.), a wearable computer device, or another device that may receive and/or transmit information wirelessly. In examples, STA 200 may include a keyboard, a display, a non-volatile memory port, multiple antennas, a graphics processor, an application processor, speakers, and other mobile device elements. The display may be a liquid crystal display (LCD) screen including a touch screen.

Although STA 200 is illustrated as having several separate functional elements, two or more of the functional elements may be combined and may be implemented by combinations of software-configured elements, such as processing elements including DSPs, and/or other hardware elements. For example, some elements may include one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of STA 200 may refer to one or more processes operating on one or more processing elements. The channel estimation technique performed by STA 200 enables STA 200 to be deployed for CSI-based locationing, sensing, and performance improvements and overcomes the problems of low-cost IoT devices with a single RX chain. For example, STA 200 emulates a higher-cost network device with multiple RX chains and multiple antennas by providing an equivalent CSI matrix that can be used for CSI-based locationing, sensing, and performance improvements. Further, the equivalent CSI matrix obtained by STA 200 is an IEEE 802.11 standards compliant CSI matrix for CSI-based applications. Therefore, as a practical matter, the channel estimation technique improves the performance of a user client device with a single RX chain that is coupled to transmit nodes in a communication network and an overall network, which enables the user client device with a single RX chain to be deployed in CSI-based applications.

Figure 3:
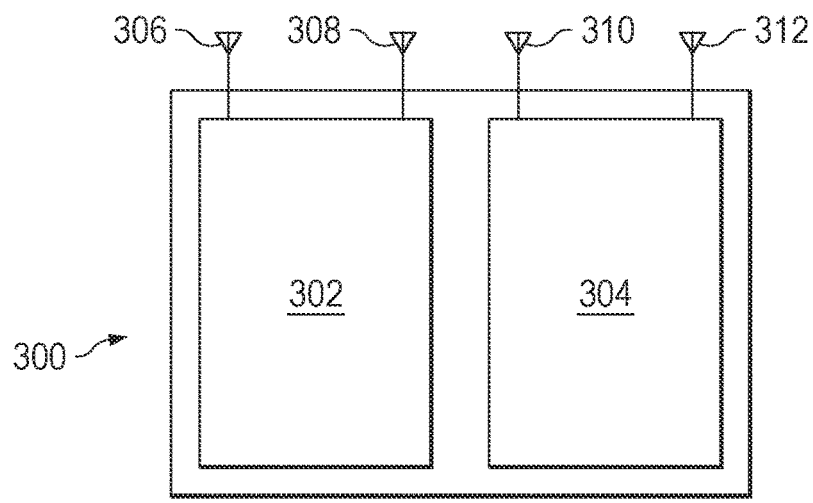
FIG. 3 is a block diagram of a computing device in accordance with various examples.

FIG. 3 is a block diagram of a transmit node 300 in accordance with various examples. In an example, transmit node 300 is transmit node 104 (for example, network node) shown in FIG. 1. In an example, transmit node 300 includes STA 302, STA 304, and antennas 306, 308, 310, 312. In an example, STA 302 is a user client device/node having a single RX chain with antennas 306 and 308, and STA 304 is a user client device/node having a single RX chain with antennas 310 and 312. In an example, each STA 302 and STA 304 are STA 200. In an example, transmit node 300 with two radios (for example, STA 302 and STA 304) represents a multiple RX chain device. In operation, transmit node 300 is operable to transmit WLAN packets in a WLAN (for example, communication network 102 in FIG. 1). In an example, transmit node 300 transmits WLAN packets simultaneously using each STA 302 and STA 304. In an example, the transmit node 300 transmits WLAN packets with one or more predetermined/predefined fields including one or more of an IEEE 802.11 MAC header field, a PHY preamble field, a PHY header field, or data fields that are used by STA 302 and STA 304 to obtain CSI information for channel estimation. The one or more fields include PHY preamble fields such as, for example, one or more STFs, one or more LTFs, and one or more SIG fields, the PHY MAC header fields such as, for example, an IP address in the MAC header, and/or a repetitive data portion such as, for example, a PE field that resides at the end of every WLAN packet. In an example, the WLAN packets are directed to STA (for example, STA 106 or STA 108 shown in FIG. 1) in the communication network (for example, communication network 102 shown in FIG. 1).

Figure 4:
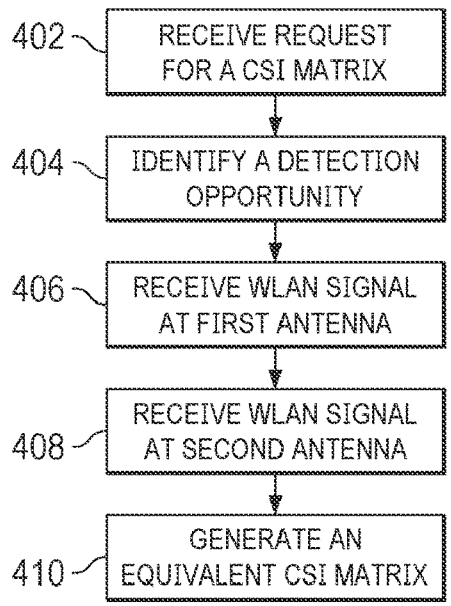
FIG. 4 is a method for obtaining a CSI matrix for a signal transmission on a single channel in accordance with various examples.

FIG. 4 is a method implemented by a user client device in a WLAN in accordance with various examples. In an example, a user client device is STA 106 or STA 108 that is shown in FIG. 1. The method of FIG. 4 implements a channel estimation technique using a user client device with a single RX chain to obtain an equivalent CSI matrix during signal transmission of a WLAN packet. The method of FIG. 4 includes the following steps.

At step 402, the user client device receives a request for a CSI matrix. In an example, the user client device receives the request from a location engine via the transmit node. In an example, the transmit node is transmit node 104 shown in FIG. 1. In an example, the location engine requests the CSI matrix for locationing or performance measurements of the channel that is connected to the user client device.

At step 404, the user client device identifies a detection opportunity. In an example, the user client device identifies a WLAN packet in a signal that is transmitted on a communication channel from the transmit node in the WLAN (for example, communication network 102 in FIG. 1). In an example, WLAN packets are directed to (for example, intended for) a neighboring user client device that is a neighbor to the user client device, which avoids a conflict when a signal that is directed to the user client device also arrives at around the same time period. In an example, the user client device is operable to receive, from the transmit node, the WLAN packet for a neighboring user client device as the user client device is in the BSS of the WLAN, which includes the transmit node. In an example, each WLAN packet is transmitted on a 20 MHz channel bandwidth periodically over an 80 MHz operating channel bandwidth of the transmit node. Each WLAN packet represents an opportunity to obtain information in the time domain for channel estimation.

In an example, each WLAN packet may include a PPDU frame with a preamble field, a SIG field, and a payload data field with OFDM symbols. In an example, where the WLAN packet is a classic WIFI or legacy OFDM-based WLAN packet, the payload data field includes OFDM symbols with 48 data subcarriers (for example, frequency index of −26 to +26) and 4 pilot subcarriers/tones (for example, frequency indices of ±21 and ±7). In an example where the WLAN packet is a WIFI-6 OFDMA-based WLAN packet (for example, an IEEE 802.11ax WLAN packet), the WLAN packet includes resource units with OFDM symbols that may include 26, 52, 106, 242, 484, or 996 subcarriers. The OFDM symbols include predefined pilot subcarrier signals that are at fixed frequency indices (for example, predefined frequency indices). The user client device identifies the pre-defined OFDM symbols in the WLAN packet based on a unique waveform. In an example, the user client device identifies predetermined/predefined OFDM symbols for pilot signals in one or more fields of the WLAN packet. In an example of a beacon frame, the user client device listens for beacon frames using the beacon time schedule in the beacon interval field. In an example, the user client device uses the beacon frame to perform channel estimation.

At step 406, the user client device receives the WLAN packet at a first antenna in a first time period. In an example, the user client device receives the WLAN packet that is transmitted from a transmit node (for example, by a transmitter in the transmit node) in the WLAN. In an example, the user client device may switch to the first antenna to receive the WLAN packet in a 20 MHz channel bandwidth at the first antenna. In examples, the user client device stores field information from the WLAN packet including the predefined OFDM symbols that may be obtained from one or more fields in the PHY preamble, PHY header, and/or data fields. The OFDM symbols may include data subcarriers and pilot subcarriers. In an example, the first antenna sends the information obtained from the WLAN packet to a processor for channel estimation. In an example, the user client device generates a first CSI tile for the 20 MHz channel bandwidth using the field information from the WLAN packet. In an example, the user client device generates a first CSI tile from OFDM symbols in an LTF of the first WLAN packet.

At step 408, the user client device switches from the first antenna to a second antenna to receive a signal at the second antenna. In an example, the user client device receives (for example, obtains) a signal comprising a WLAN packet at the second antenna in a second time period. In an example, the WLAN packet is a second WLAN packet that is based on the first WLAN packet with multi-path effects as it experiences collisions or reflections while transmitted from the transmit node as it arrives at the second antenna packet. In another example, the second WLAN packet is a 20 MHz channel bandwidth WLAN packet that is transmitted by the transmit node at different central frequencies than the 20 MHz channel bandwidth of the first WLAN packet. As used herein, a multi-path effect of a WLAN packet includes amplitude attenuation and phase shift of OFDM symbols in the WLAN packet from reflections or collisions in the wireless channel as the WLAN packet arrives at an antenna by two or more paths. In an example, the user client device receives the second WLAN packet that includes predetermined/predefined fields. In an example, during a switching time period when the user client device switches from the first antenna to the second antenna to receive the signal, the user client device may receive unreliable information in the wireless channel, which is disregarded. The user client device stores the field information from the WLAN packet that is received for processing at the user client device. In an example, the user client device generates a second CSI tile for the 20 MHz channel bandwidth using OFDM symbols in the fields from the WLAN packet. In an example, the user client device generates a second CSI tile from OFDM symbols in LTF of the second WLAN packet. In an example, the user client device may switch back to the first antenna from the second antenna in order to receive an additional WLAN packet over a multi-path channel, and stores the PHY preamble, PHY header (for example, MAC header), and/or data fields from the additional WLAN packet that is received. In an example, the user client device may generate another CSI tile for the 20 MHz channel bandwidth using the information from the WLAN packet. In an example, the user client device may switch back and forth between the first antenna and second antenna to obtain additional CSI tiles at each antenna after switching.

At step 410, the user client device generates an equivalent CSI matrix using information from one or more of the fields in the WLAN packet. In examples, the user client device generates CSI tiles from fields located at the PHY preamble, generates CSI tiles from fields located at the PHY or MAC header, generates CSI tiles based on known synchronized sequence fields transmitted at the WLAN packet or based on the WLAN packet's known repetitive signal (for example WLAN packet's pilot symbols or PE field) in the WLAN packets that are received at the first antenna and the second antenna. In an example, as discussed above, the user client device generates the first CSI tile from the first LTF information in the PHY preamble that is obtained using the first antenna, and generates the second CSI tile from the following LTF information of a PHY preamble obtained using the second antenna. In an example, the user client device generates a first CSI tile using the first 20 MHz channel bandwidth WLAN packet and generates a second CSI tile using the second 20 MHz WLAN packet that is transmitted at different central frequencies from the same transmitter. In an example, the user client device aggregates the first CSI tile with the second CSI tile to obtain an equivalent 40 MHz CSI matrix from the two 20 MHz channel bandwidth CSI tiles. In an example, the user client device performs RF chain CSI tile combining by combining the first CSI tile with the second CSI tile (for example, performing frequency domain CSI tile combining). The channel estimation technique enables the transmit node (for example, a low-cost IoT device) to generate an equivalent CSI matrix that emulates a CSI matrix of a multiple RX chain network device and be deployed for CSI-based locationing, sensing, and performance improvements. Further, the equivalent CSI matrix is an IEEE 802.11 standards compliant CSI matrix for CSI-based applications in, for example, CSI-based locationing, sensing, and performance improvements. Therefore, as a practical matter, the channel estimation technique improves the performance of a user client device with a single RX chain and transmit nodes in the WLAN and the overall network, which enables the user client device with a single RX chain to be deployed in CSI-based applications.

Figure 5:
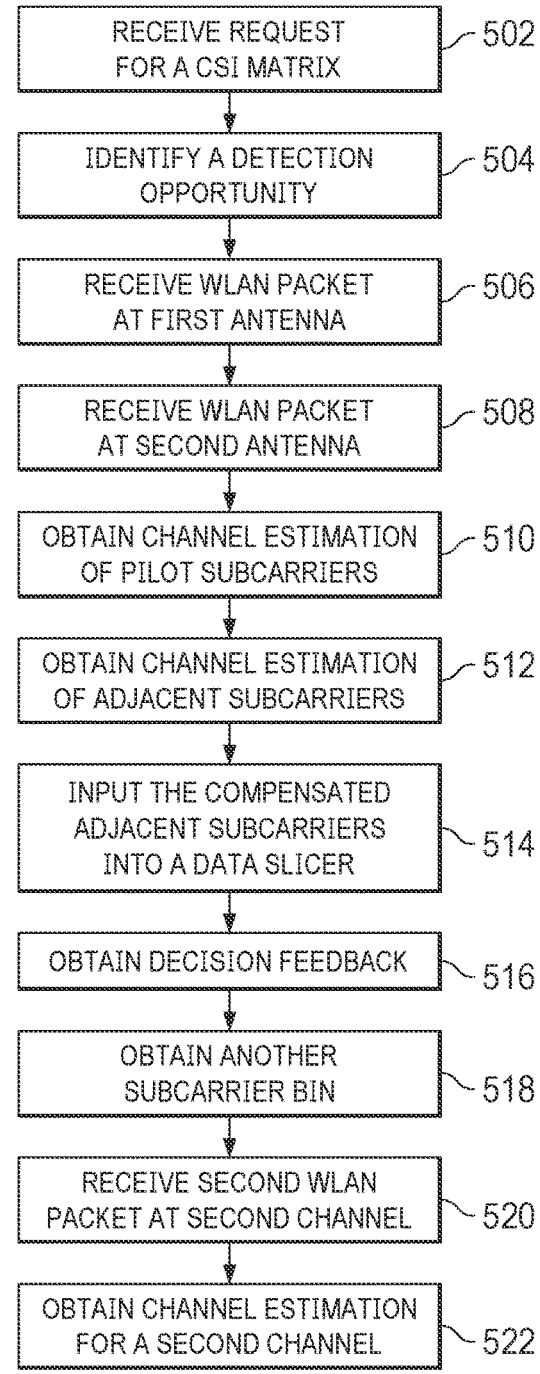
FIG. 5 is a method for obtaining a CSI matrix for a signal transmission on multiple channels in accordance with various examples.

FIG. 5 is a method implemented by a user client device in a WLAN in accordance with various examples. In an example, the user client device is STA 106 or STA 108 in FIG. 1. In an example, the method of FIG. 5 implements a channel estimation technique on a user client device with a single RX chain when multiple transmissions of a WLAN packet are received by the STA. The channel estimation technique provides an equivalent CSI matrix for the communication link between the transmit node and the user client device. The method of FIG. 5 includes the following steps.

At step 502, a user client device receives a request for a CSI matrix. In an example, the request for the CSI matrix is sent from a location engine that is coupled to the transmit node in the WLAN. In an example, the transmit node is transmit node 104 that is shown in FIG. 1.

At step 504, the user client device identifies an opportunity to detect WLAN packets in the WLAN (for example, communication network 102 in FIG. 1) for channel state estimation. In an example, the user client device listens on a communication channel in the WLAN for WLAN packets that are transmitted from a transmit node (for example, an AP). In an example, the WLAN packets are directed to a neighboring user client device that is a neighbor of the user client device ("neighboring user client device") and is not intended for reception by the user client device. In an example, the transmit node transmits WLAN packets over an 80 MHz channel bandwidth. Each WLAN packet represents an opportunity to identify information for channel state estimation.

At step 506, the user client device receives a first WLAN packet from the transmit node at a first antenna in a first time period. In examples, the user client device receives the WLAN packet with OFDM symbols that are transmitted in a PHY preamble field, a PHY MAC header field, and/or a payload data field of the WLAN packet on a 20 MHz channel bandwidth. For instance, the PHY preamble field includes one or more of STFs, of LTFs, and of SIG fields, the PHY MAC header field includes an IP address in the MAC header, and a payload data field includes the PE field. In an example, the user client device stores the OFDM symbols from the fields in the WLAN packet. Each OFDM symbol includes predefined subcarriers (for example, predefined center frequencies of subcarriers) that can include predefined pilot subcarriers. In examples, the WLAN packet may be a legacy OFDM-based WLAN packet (for example, a classic WIFI packet of an IEEE 802.11a/g/p/j/n/ac/ah WLAN packet) or a WIFI-6 OFDMA-based WLAN packet (for example, an IEEE 802.11ax WLAN packet).

In an example, the user client device identifies predefined subcarriers at predefined subcarrier indices from one or more LTFs in the preamble of the 20 MHz channel bandwidth WLAN packet. In an example, the LTF with its predefined subcarriers at predefined subcarrier indices is identifiable a-priori to receiving the WLAN packet and can be used for synchronization of the transmitter. In an example, the STA processes the subcarriers in the LTFs to obtain a first CSI tile for a 20 MHz channel bandwidth of the WLAN that may be used to estimate an equivalent CSI matrix. In an example, the first CSI tile may be determined according to the equation $Ri=Xi*Hi_{ANT1}$, where Xi is a vector of complex numbers (i+jq) representing constellation points in the input data at the transmitter that is mapped onto N orthogonal subcarriers representing mapped constellation points of an OFDM symbol, $Hi_{ANT1}$ is a multi-path channel response for i subcarriers using the first antenna that represents a vector of a channel response for the 20 MHz channel bandwidth in the frequency domain, and Ri is a vector of complex numbers at the receiver for i subcarriers that are received after a fast Fourier transform (FFT) is performed on the OFDM symbols to recover the constellation points of the input data. $Hi_{ANT1}$ is estimated by the user client device using $Hi_{ANT1}=Ri/Xi$, as the LTF in Xi is known a-priori to the user client device. Assuming ideal channel estimation of the multi-path channel $Hi_{ANT1}$, $\hat{Hi}_{ANT1}$ is equal to $Hi_{ANT1}$. During reception at the first antenna, Yi is equal to the transmitted Xi, and is obtained according to Equation 1, where Yi is a vector of constellation points of the input data.

$$Yi=Ri/\hat{Hi}_{ANT1}=Ri/Hi_{ANT1} \qquad (1)$$

$$Yi=(Xi*Hi_{ANT1})/Hi_{ANT1} \qquad (2)$$

$$Yi=Xi \qquad (3)$$

As shown in Equation 3, Yi is equal to the transmitted Xi. The $Hi_{ANT1}$ is passed to the user client device as the first CSI tile of the 20 MHz channel bandwidth that is obtained using the first antenna.

At step 508, the user client device switches to a second antenna to receive (for example, obtain) a second WLAN packet in a second time period. In an example, the second WLAN packet is the same first WLAN packet that has experienced multi-path effects during transmission. In an example, the second WLAN packet is a 20 MHz WLAN packet that is transmitted at different central frequencies from a transmitter at the transmit node. In an example, the second WLAN packet includes constellation points of the input data that are mapped onto N orthogonal subcarriers representing mapped constellation points of an OFDM symbol. In an example, the OFDM symbols include pilot subcarriers that have a known data sequence. The pilot subcarriers may be used for synchronization between a transmitter at the transmit node and a receiver at the user client device. In an example, the pilot subcarriers (for example, subcarrier bins) in each 20 MHz channel bandwidth is assumed to be continuous in frequency and does not vary in the frequency domain. In an example, the STA stores pilot-subcarrier indices i of the pilot subcarriers in a pilot subcarrier bin for the second WLAN packet. In an example, each pilot subcarrier is equivalent to a pilot subcarrier bin.

At step 510, the user client device determines a channel estimation $Hi_{ANT2}$ of pilot subcarriers i in a pilot subcarrier bin of the second WLAN packet, using an a-priori knowledge of predefined symbols at predefined pilot subcarriers that are transmitted in a WLAN packet. In an example, during reception at the second antenna, the user client device determines the multi-path channel response $Hi_{ANT2}$ for i subcarriers at the second antenna. For every pilot subcarrier index i, a channel estimation $Hi_{ANT2}$ of pilot subcarriers with pilot subcarrier indices i is generated. Channel estimation $Hi_{ANT2}$ depicts a multi-path channel effect in the frequency domain and is a function of a multi-path channel, cyclic shift diversity, and beamforming. In an example, $Hi_{ANT2}$ is a complex number. If Ri is available, then $Hi_{ANT2}$ may be calculated for pilot bins using $Hi_{ANT2}=Ri/Xi$ as Xi of pilot subcarrier bins is known to the user client device. In an example, where only Yi is available, channel compensation uses a channel estimation of $Hi_{ANT1}$. In an example, Yi is not equal to Xi, and is equal to $Xi*(Hi_{ANT2}/Hi_{ANT1})$. In the pilot subcarrier bins, Xi is known to the user client device, and $Hi_{ANT2}$ may be calculated as $Hi_{ANT2}=(Yi*Hi_{ANT1})/Xi$. In an example, $Hi_{ANT2}$ is calculated for every pilot subcarrier bin using step 510.

At step 512, the user client device determines a channel response $Hj_{ANT2}$ for adjacent subcarriers Xj with subcarrier indices j. In an example, adjacent subcarriers Xj, as used herein, are subcarriers that are immediately adjacent to the pilot subcarriers without an intervening subcarrier between the pilot subcarrier Xi and the adjacent subcarrier Xj on either side of the pilot subcarrier Xi. In an example, subcarrier index j of an adjacent subcarrier Xj that is adjacent to the pilot subcarrier Xj with a pilot subcarrier index i is obtained. For example, for every pilot subcarrier index i, adjacent subcarrier indices j are either i+1 or i−1. Using a channel continuity assumption that the subcarriers in the 20 MHz channel bandwidth are continuous, the user client device uses the channel estimation $Hi_{ANT2}$ of all pilot subcarriers with pilot subcarrier index i as a rough channel estimation $Hj_{ANT2}$ of adjacent subcarriers Xj in subcarrier indices j for the 20 MHz channel bandwidth that are adjacent to the pilot subcarrier Xi with pilot subcarrier indices i. In an example, a rough channel estimation $Hj_{ANT2}$ of adjacent subcarriers Xj with subcarrier indices j in the channel is used to compensate for the channel effects in adjacent subcarriers Xj with adjacent subcarrier indices j. The compensated adjacent subcarriers X'j are stored in a compensated adjacent subcarrier bin. In an example, $Hj_{ANT2}$ is determined for subcarrier indices j=i+1 or j=i−1, which represents the channel response for a bin neighboring the pilot subcarrier bin. In an example, the user client device does not know Xj a-priori and uses decision feedback to determine Xj. The user client device assumes continuous channel response for the subcarriers in the 20 MHz channel bandwidth that does not change rapidly between neighboring bins of the pilot subcarrier bin. Using the channel continuity assumption:

$Hj_{ANT2}$ is equal to $Hi_{ANT2}$, and $Rj_{ANT2}/Hi_{ANT2}$ is approximately equal to $Rj_{ANT2}/Hj_{ANT2}$. As $Rj_{ANT2}/Hj_{ANT2}=Xj$, then $Rj_{ANT2}/Hi_{ANT2}$ is approximately equal to Xj.

At step 514, the user client device inputs the compensated adjacent subcarrier bin X'j with compensated adjacent subcarriers indices j into a data slicer. In an example, X'j is a constellation point and is not equal to any value, but is part of a pre-defined set of constellation points known to the user client device. The user client device may incorporate a 'hard slicer' over $Rj_{ANT2}/Hi_{ANT2}$.

At step 516, the user client device obtains a decision feedback on the slicing that is performed on the compensated adjacent subcarrier bin X'j. In an example, the user client device may estimate the constellation points for the compensated adjacent subcarrier bin in order to obtain a decision on the compensated adjacent subcarrier bin X'j. In an example, the decision feedback on the slicing is used to obtain an estimate of the channel response for the adjacent subcarriers $Hj_{ANT2}$ with subcarrier indices j. In an example, the data slicer generates a slicing decision on the adjacent subcarriers Xj with subcarrier indices j in the compensated adjacent subcarrier bin with a good probability when there are no slicing errors. The slicing decision is used to obtain an estimated channel response $Hj_{ANT2}$ of the adjacent subcarriers Xj with subcarrier indices j. In an example, the user client device may calculate $Hj_{ANT2}$ using the adjacent subcarriers Xj according to $Hj_{ANT2}=Rj_{ANT2}/Xj$.

At step 518, the user client device obtains a second subcarrier bin of additional subcarriers with a subcarrier index k. The additional subcarriers are not pilot subcarriers with pilot subcarrier indices i or adjacent subcarriers with adjacent subcarrier indices j. In an example, the user client device performs channel estimation on the remaining subcarriers by determining a signal-to-noise ratio (SNR) in the second subcarrier bin. In an example, steps 510 to 518 are iteratively repeated when the SNR of the new subcarriers with subcarrier indices k do not include multi-path null values and have constellation points that are spaced with a large radius ("spacious" positions), until all data subcarriers in the 20 MHz channel bandwidth are estimated (for example, a CSI matrix for all subcarriers is obtained). In an example, a multi-path null is a zero amplitude subcarrier that occurs when the second WLAN packet arrives exactly out of phase with the first WLAN packet and cancels out the first WLAN packet. In an example, the user client device uses $Hj_{ANT2}$ for the adjacent subcarriers with subcarrier indices j with j=i+1 and j=i−1. The previous steps 510 to 518 for pilot subcarrier with pilot subcarrier indices k may be repeated. Pilots k are neighbors to adjacent subcarriers with subcarrier indices j. In an example, the previous steps are repeated for k=i+2 and k=i−2 using an assumption that $Hk_{ANT2}$ is similar to $Hi_{ANT2}$. In an example, steps 510 to 518 are iteratively repeated until all bins of $Hk_{ANT2}$ are determined or calculated. $Hk_{ANT2}$ is used as the CSI tile for the second antenna. The user client device aggregates the first CSI tile with the second CSI tile to generate the equivalent CSI matrix for the channel between the transmit node and the user client device.

At step 520, the user client device switches to the first antenna and receives another WLAN data packet and step 506 is repeated.

At step 522, the user client device obtains channel estimation for a second channel. In an example, the user client device switches to the second antenna and steps 508 to 518 are performed until all signals are received over a wideband bandwidth of the WLAN and each channel is estimated. The equivalent CSI matrix is of a same quality as an equivalent CSI matrix obtained using the LTF in step 506. The channel estimation technique enables the user client device to emulate a higher-cost network device and be deployed for CSI-based locationing, sensing, and performance improvements. Further, the equivalent CSI matrix is an IEEE 802.11 standards compliant CSI matrix for CSI-based applications in, for example, CSI-based locationing, sensing, and performance improvements. Therefore, as a practical matter, the channel estimation technique improves the performance of a user client device with a single RX chain and transmit nodes in the WLAN and the overall network, which enables the user client device with a single RX chain to be deployed in CSI-based applications.

Figure 6:
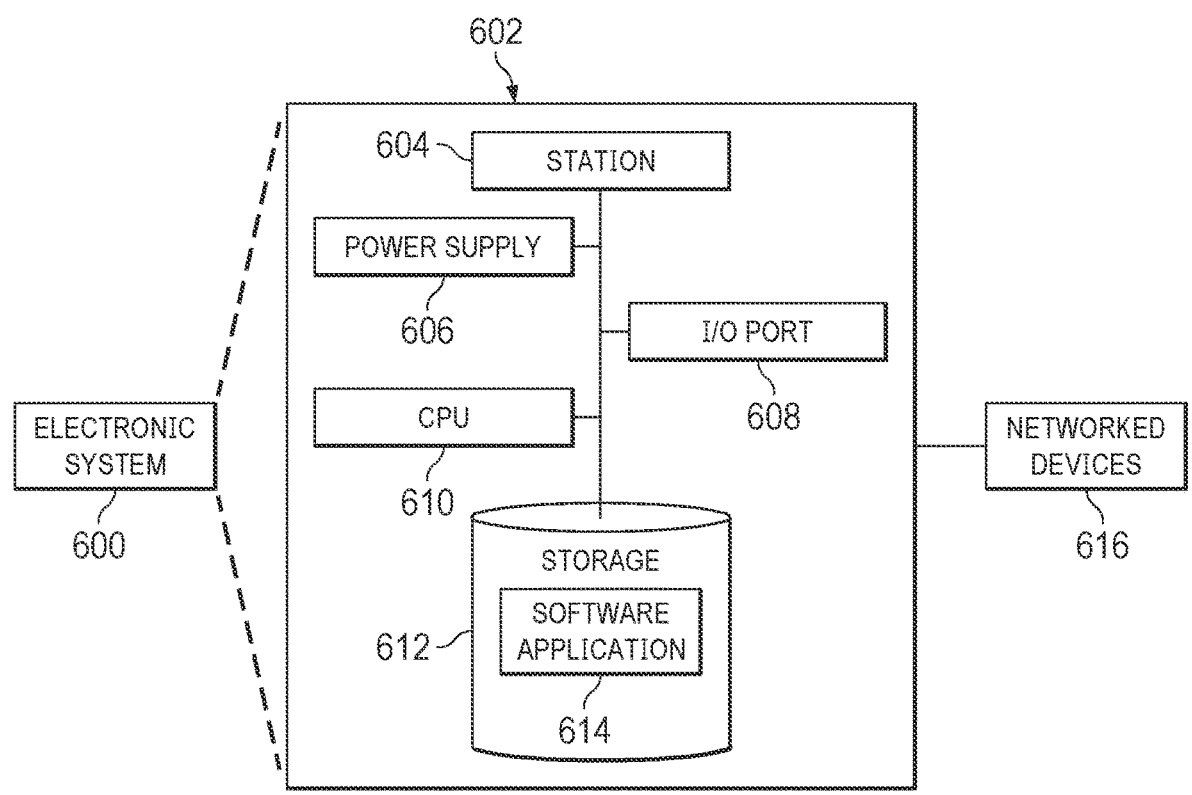
FIG. 6 is a block diagram of an electronic device in accordance with various examples.

FIG. 6 is a block diagram of an electronic device 602 in accordance with various examples. In examples, the electronic device 602 is, or is incorporated into, or is coupled (for example, connected) to an electronic system 600, such as a computer, electronics control "box" or display, communications equipment (including transmitters or receivers), or any type of electronic system operable to process information.

In some examples, electronic device 602 comprises a megacell or a system-on-chip (SoC) that includes control logic, and a station 604, a power supply 606, input-output (I/O) port 608, central processing unit (CPU) 610, and storage 612 (for example, a RAM). In an example, electronic device 602 is coupled to networked devices 616. In an example, station 604 is an example of STA 200 (shown in FIG. 2). In an example, networked devices 616 are an example of transmit node 300 (for example, a network node) shown in FIG. 3. CPU 610 is a CISC-type (Complex Instruction Set Computer) CPU, RISC-type CPU (Reduced Instruction Set Computer), MCU-type (Microcontroller Unit), or a DSP. CPU 610 comprises one or more processors. The one or more processors are arranged to execute code for transforming the one or more processors into a special-purpose machine or for improving the functions of other components in electronic device 602 to provide a desired output without performing similar operations as the one or more processors. CPU 610 comprises memory and logic that store information frequently accessed from storage 612.

In some examples, storage 612 is memory such as an on-processor cache, off-processor cache, RAM, flash memory, or disk storage for storing one or more software applications 614 (for example, embedded applications). The one or more software applications 614 (for example, embedded applications), when executed by CPU 610, perform functions associated with electronic device 602 that are described herein.

In an example, a networked device 616 controls electronic device 602 using instructions for performing a channel estimation technique that is described herein. In an example, storage 612 stores software application 614 (for example, embedded applications) for performing the channel estimation technique using a transmission stream received by electronic device 602 or multiple transmission streams received by electronic device 602.

CPU 610 and power supply 606 are coupled to I/O port 608. In an example, I/O port 608 provides an interface that is configured to receive input from (and/or provide output to) networked devices 616. Networked devices 616 can include any device (including test equipment) capable of point-to-point and/or networked communications with electronic device 602. In examples, electronic device 602 is coupled to peripherals and/or other computing devices, including tangible, non-transitory media (such as flash memory), and/or cabled or wireless media. These and other input and output devices are selectively coupled to the electronic device 602 by external devices using wireless or cabled connections. Storage 612 is accessible, for example, by networked devices 616. Power supply 606, CPU 610, and storage 612 are also optionally coupled to an external power supply (not shown), which is configured to receive power from a power source (such as a battery, solar cell, "live" power cord, inductive field, fuel cell, capacitor, and the like).

In an example, power supply 606 is in the same physical assembly as electronic device 602, or is coupled to electronic device 602. While not shown in FIG. 6, power supply 606 includes power generating components. Power generating components include one or more power switches. Each of the switches is independently controlled for generating power to supply power at various input voltages to various components of electronic device 602. Electronic device 602 operates in various power-saving modes wherein individual voltages are supplied (and/or turned off) by the power switches in accordance with a selected power-saving mode and the various components arranged within a specific power domain.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (for example, programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (for example, a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. Modifications are possible in the described examples, and other examples are possible within the scope of the claims.

What is claimed is:

1. A user client device for channel estimation in a network, comprising:
   a transceiver comprising a single receive (RX) chain;
   a first antenna coupled to the transceiver;
   a second antenna coupled to the transceiver; and
   a processor coupled to the transceiver, the first antenna, and the second antenna and configured to execute instructions that cause the user client device to:
      couple the single RX chain to the first antenna to receive a first data packet on a first channel, wherein the first data packet on the first channel comprises a first plurality of fields;
      determine a first channel state information (CSI) tile of the first channel based on one or more of the first plurality of fields;
      decouple the first antenna from the single RX chain and couple the second antenna to the single RX chain to continue receiving the first data packet on a second channel, wherein the first data packet on the second channel comprises a portion of the first plurality of fields;
      determine a second CSI tile of the second channel based on one or more of the portion of the first plurality of fields;
      aggregate the first CSI tile with the second CSI tile; and
      generate a CSI matrix based on aggregating the first CSI tile with the second CSI tile.

2. The user client device of claim 1, wherein the first data packet is a wireless local area network (WLAN) packet, wherein the first plurality of fields comprises a first physical layer (PHY) preamble, a first PHY header, and a first media access control (MAC) header, and wherein the processor is configured to generate the first CSI tile based on first subcarrier information in any field of the first PHY preamble, the first PHY header, and the first MAC header.

3. The user client device of claim 1, wherein the processor is further configured to receive a second data packet comprising a second plurality of fields with the second antenna.

4. The user client device of claim 3, wherein the second data packet is a WLAN packet, wherein the second plurality of fields comprises a second PHY preamble, a second PHY header, and a second MAC header, and wherein the processor is configured to generate the second CSI tile based on second subcarrier information in any field of the second PHY preamble, the second PHY header, and the second MAC header.

5. The user client device of claim 4, wherein the second plurality of fields comprises a payload field, and wherein the processor is further configured to generate the second CSI tile based on pilot subcarrier information in the payload field.

6. The user client device of claim 4, wherein the first plurality of fields and the second plurality of fields comprise one or more long training fields (LTFs), and wherein the processor is configured to generate the second CSI tile based on any LTF in the one or more LTFs.

7. The user client device of claim 1, wherein the first data packet is directed to a second user client device that is a neighbor to the user client device.

8. The user client device of claim 1, wherein the first data packet is directed to the user client device.

9. The user client device of claim 1, wherein the first plurality of fields comprises a payload field, and wherein the processor is further configured to generate the first CSI tile based on pilot subcarrier information in the payload field.

10. A system for channel estimation in a network, comprising:
    a transmit node configured to transmit a first data packet; and
    a first user client node wirelessly coupled to the transmit node, wherein the first user client node comprises:
       a transceiver comprising a single receive (RX) chain, a first antenna, and a second antenna; and
       a processor coupled to the transceiver, the first antenna, and the second antenna and configured to execute instructions that cause the first user client node to:
          couple the single RX chain to the first antenna;
          receive the first data packet from the first antenna, wherein the first data packet from the first antenna comprises a first physical layer (PHY) preamble, a first PHY header, and a first media access control (MAC) header;
          determine a first channel state information (CSI) tile based on one or more of the first PHY preamble, the first PHY header, and the first MAC header of the first data packet from the first antenna;
          decouple the first antenna from the single RX chain and couple the second antenna to the single RX chain;
          continue to receive the first data packet from the second antenna, wherein the first data packet from the second antenna comprises at least a portion of the first PHY preamble, the first PHY header, and the first MAC header;
          determine a second CSI tile based on the first data packet from the second antenna;
          aggregate the first CSI tile with the second CSI tile; and
          generate a CSI matrix based on aggregating the first CSI tile with the second CSI tile.

11. The system of claim 10, wherein the first PHY preamble comprises one or more long training fields (LTFs), and wherein the instructions cause the first user client node to generate the first CSI tile based on any LTF in the one or more LTFs.

12. The system of claim 10, wherein the first data packet is a wireless local area network (WLAN) packet comprising a first plurality of orthogonal frequency division multiplexing (OFDM) symbols in the first PHY preamble, the first PHY header, and the first MAC header, and wherein the instructions cause the first user client node to generate the first CSI tile based on the first plurality of OFDM symbols.

13. The system of claim 10, wherein the instructions cause the first user client node to receive a second data packet comprising a second plurality of fields from the second antenna, wherein the second data packet is a multi-path WLAN packet comprising a second plurality of OFDM symbols in a second PHY preamble, a second PHY header, and a second MAC header, and wherein the instructions cause the first user client node to generate the second CSI tile based on the second plurality of OFDM symbols.

14. The system of claim 13, wherein the second PHY preamble comprises one or more LTFs, and wherein the instructions cause the first user client node to generate the second CSI tile based on any LTF in the one or more LTFs.

15. The system of claim 10, wherein the system further comprises a second user client node wirelessly coupled to the transmit node and that is a neighbor to the first user client node, and wherein the instructions cause the first user client node to generate the first CSI tile based on the first data packet that is directed to the second user client node.

16. The system of claim 10, wherein the instructions cause the first user client node to generate the first CSI tile based on the first data packet that is directed to the first user client node.

17. The system of claim 10, wherein the first data packet is a WLAN packet comprising a payload field, and wherein the instructions further cause the first user client node to generate the first CSI tile based on pilot subcarrier information in the payload field.

18. A method for channel estimation in a network, comprising:
 providing a user client device comprising a single receive (RX) chain transceiver, a first antenna, and a second antenna;
 coupling the single RX chain transceiver to the first antenna;
 receiving, by the first antenna, a first data packet on a first channel, wherein the first data packet on the first channel comprises a first plurality of fields;
 determining a first channel state information (CSI) tile of the first channel based on one or more of the first plurality of fields;
 decoupling the first antenna from the single RX chain transceiver and coupling the second antenna to the single RX chain transceiver;
 continue receiving, by the second antenna, the first data packet on a second channel, wherein the first data packet on the second channel comprises at least a portion of the first plurality of fields;
 determining a second CSI tile of the second channel based on receiving the first data packet on the second channel;
 aggregating the first CSI tile with the second CSI tile; and
 generating a CSI matrix based on aggregating the first CSI tile with the second CSI tile.

19. The method of claim 18, further comprising generating the first CSI tile based on the first data packet that is directed to a second user client device that is a neighbor to the user client device.

20. The method of claim 18, further comprising generating the first CSI tile based on the first data packet that is directed to the user client device.

* * * * *